US008980774B2

(12) United States Patent
Zhang et al.

(10) Patent No.: US 8,980,774 B2
(45) Date of Patent: Mar. 17, 2015

(54) COMPOSITIONS AND METHODS FOR MAKING POLYESTERS AND ARTICLES THEREFROM

(75) Inventors: Yingchao Zhang, Louisville, KY (US); Raman C. Subrayan, Louisville, KY (US); Vinay Malhotra, Louisville, KY (US); David A. Snover, Floyds Knobs, IN (US)

(73) Assignee: Hexion Inc., Columbus, OH (US)

( * ) Notice: Subject to any disclaimer, the term of this patent is extended or adjusted under 35 U.S.C. 154(b) by 0 days.

(21) Appl. No.: 13/524,828

(22) Filed: Jun. 15, 2012

(65) Prior Publication Data

US 2013/0337712 A1 Dec. 19, 2013

(51) Int. Cl.
| | |
|---|---|
| B32B 5/02 | (2006.01) |
| B32B 27/30 | (2006.01) |
| B32B 27/36 | (2006.01) |
| B32B 27/42 | (2006.01) |
| B32B 17/04 | (2006.01) |
| C03C 25/24 | (2006.01) |
| C08K 5/07 | (2006.01) |
| C08L 29/04 | (2006.01) |
| C08L 33/00 | (2006.01) |
| C08L 33/02 | (2006.01) |
| C08L 33/08 | (2006.01) |
| C08L 33/26 | (2006.01) |
| C08L 67/00 | (2006.01) |
| D04H 1/587 | (2012.01) |
| D04H 1/64 | (2012.01) |
| D04H 13/00 | (2006.01) |
| D06M 13/224 | (2006.01) |

(52) U.S. Cl.
CPC ............. *D04H 1/587* (2013.01); *C03C 25/24* (2013.01); *C08K 5/07* (2013.01); *C08L 29/04* (2013.01); *C08L 33/00* (2013.01); *C08L 33/02* (2013.01); *C08L 33/08* (2013.01); *C08L 33/26* (2013.01); *C08L 67/00* (2013.01); *D04H 1/64* (2013.01); *D04H 13/00* (2013.01); *D06M 13/224* (2013.01)
USPC ........... 442/154; 442/155; 442/158; 442/164; 442/173; 442/180; 525/186; 525/190; 525/450; 264/171.1

(58) Field of Classification Search
CPC ......... C08L 33/00; C08L 33/02; C08L 33/04; C08L 33/06; C08L 33/08; C08L 33/26; C08L 67/00; C08L 29/04; B32B 5/02; B32B 17/00; B32B 17/02; B32B 17/04; B32B 19/02; D04H 1/64; D04H 1/587; D04H 13/00; C08K 5/07
USPC ......... 442/152, 153, 154, 155, 158, 162, 164, 442/173, 177, 180; 525/186, 190, 450; 264/171.1
See application file for complete search history.

(56) References Cited

U.S. PATENT DOCUMENTS

| | | | |
|---|---|---|---|
| 3,516,955 A | 6/1970 | Taft | |
| 4,054,713 A * | 10/1977 | Sakaguchi et al. | ............ 442/327 |
| 4,888,412 A | 12/1989 | Ebel et al. | |
| 5,480,963 A | 1/1996 | Jiang et al. | |
| 5,830,978 A * | 11/1998 | Floyd | ............ 528/245 |
| 5,977,232 A | 11/1999 | Arkens et al. | |
| 6,084,021 A | 7/2000 | Chang et al. | |
| 6,093,777 A | 7/2000 | Sorensen et al. | |
| 6,221,973 B1 * | 4/2001 | Arkens et al. | ............ 525/327.7 |
| 6,282,654 B1 * | 8/2001 | Ikeda et al. | ............ 726/31 |
| 6,350,850 B1 | 2/2002 | Ueda et al. | |
| 6,699,945 B1 * | 3/2004 | Chen et al. | ............ 525/445 |
| 6,770,169 B1 | 8/2004 | Wallace | |
| 6,861,498 B1 | 3/2005 | Imperante | |
| 6,881,529 B2 | 4/2005 | Iwasaki | |
| 7,199,212 B2 | 4/2007 | Nakajima et al. | |
| 8,133,952 B2 | 3/2012 | Pisanova et al. | |
| 2003/0176133 A1 | 9/2003 | Walker et al. | |
| 2005/0239929 A1 * | 10/2005 | Sakamoto et al. | ............ 524/115 |
| 2006/0009569 A1 | 1/2006 | Charbonneau et al. | |
| 2006/0014925 A1 | 1/2006 | Luka et al. | |

(Continued)

FOREIGN PATENT DOCUMENTS

| | | |
|---|---|---|
| CN | 102021966 A | 4/2011 |
| EP | 1391443 A2 | 2/2004 |

(Continued)

OTHER PUBLICATIONS

Pramanick et al., Synthesis and biodegradation of copolyesters from citric acid and glycerol, Polymer Bulletin 19, 365-370 (1988).
Pramanick et al., In Vitro Drug Release Profile of Bioerodable Citric Acid-Glycerol Copolymer, Journal of Applied Polymer Science, vol. 40, 1511-1517 (1990).
Weinstabl et al., Melamine Salts as Hardeners for Urea Formaldehyde Resins, Journal of Applied Polymer Science, vol. 81, 1654-1661 (2001).

Primary Examiner — Arti Singh-Pandey
Assistant Examiner — Frank Vineis

(57) ABSTRACT

Polyester materials, methods for making polyesters materials, and uses of the polyester materials in binder materials and articles of manufacture are disclosed. In one embodiment, a process is provided for preparing a polyester solution, including mixing monomers of at least one organic acid containing at least three carboxylic groups and at least one multi-hydroxyl alcohol containing at least three hydroxyl groups to form a reaction mixture, heating the reaction mixture to a first temperature, polymerizing the monomers at the first temperature until reaching an acid value from about 200 to about 400 mg KOH/g, adjusting the temperature to a second temperature less than the first temperature, and forming the polyester solution. The polyester materials may be mixed with cross-linking materials to form binder materials. The binder material may then be used to form articles of manufacture.

22 Claims, No Drawings

(56) References Cited

U.S. PATENT DOCUMENTS

| | | |
|---|---|---|
| 2007/0083004 A1* | 4/2007 | Shooshtari et al. ............ 524/593 |
| 2007/0292619 A1 | 12/2007 | Srinivasan et al. |
| 2008/0207833 A1* | 8/2008 | Bear et al. .................... 525/190 |
| 2008/0281285 A1 | 11/2008 | Noda et al. |
| 2009/0104363 A1 | 4/2009 | Abi-Karam et al. |
| 2009/0226732 A1 | 9/2009 | Anderson et al. |
| 2009/0325859 A1 | 12/2009 | Ameer et al. |
| 2010/0029160 A1 | 2/2010 | Srinivasan et al. |
| 2010/0040832 A1 | 2/2010 | Herbert |
| 2011/0159113 A1 | 6/2011 | Adeli et al. |
| 2011/0166275 A1 | 7/2011 | Zhang |
| 2011/0189479 A1 | 8/2011 | Zhang et al. |
| 2013/0337272 A1* | 12/2013 | Zhang et al. ................. 428/430 |

FOREIGN PATENT DOCUMENTS

| | | | |
|---|---|---|---|
| EP | 1655400 | A1 | 11/2005 |
| EP | 2199332 | A1 | 6/2010 |
| GB | 2234251 | A1 | 1/1991 |
| WO | WO 03/104284 | A2 | 12/2003 |
| WO | WO 03/106561 | A1 | 12/2003 |
| WO | WO 2005/026433 | A1 | 3/2005 |
| WO | WO 2005/121191 | A1 | 12/2005 |
| WO | WO 2006/063802 | A2 | 6/2006 |
| WO | WO 2007/014236 | A2 | 2/2007 |
| WO | WO 2007/060236 | A1 | 5/2007 |
| WO | WO 2008/000871 | A2 | 1/2008 |
| WO | WO 2008/089847 | A1 | 7/2008 |
| WO | WO 2008/089848 | A1 | 7/2008 |
| WO | WO 2009/006532 | A1 | 1/2009 |
| WO | WO 2009/080697 | A1 | 7/2009 |
| WO | WO 2010/059925 | A1 | 5/2010 |
| WO | WO 2010/114626 | A1 | 10/2010 |
| WO | WO 2011/044490 | A1 | 4/2011 |
| WO | WO 2011/068984 | A2 | 6/2011 |
| WO | WO 2011/097212 | A1 | 8/2011 |

* cited by examiner

COMPOSITIONS AND METHODS FOR MAKING POLYESTERS AND ARTICLES THEREFROM

BACKGROUND OF THE INVENTION

1. Field of the Invention

The present invention relates to polyester materials. The present invention particularly relates to methods of preparing polyester materials and products incorporating polyester materials.

2. Background of the Art

Formaldehyde is one of the most common chemicals used in industry. International production was over 46 billion pounds in 2004, according to the International Agency for Research on Cancer (IARC). It is well known as a preservative in medical laboratories, as an embalming fluid, and as a sterilizer. Formaldehyde's primary use is in the production of resins and as a chemical intermediate. Urea-formaldehyde (UF) and phenol formaldehyde (PF) resins are used in foam insulations, as adhesives in the production of particleboard and plywood, and in the treating of textiles.

Unfortunately, formaldehyde is considered undesirable in many applications. Since 1990, several companies have attempted to develop formaldehyde-free products which are equivalent to products containing formaldehyde for roofing glass mat and glass fiber insulation. Such products, polymer emulsion and polymer dispersion are often more expensive and do not have the same performances as traditional formaldehyde based resins. Many companies have worked on sustainable formaldehyde-free binders, such us sugar-based binders and other bio-based materials, for construction materials. However, these materials have not illustrated good mechanical properties and performance.

It would be desirable to form resins that are free, or have reduced amounts, of formaldehyde that also have good mechanical properties, or impart good mechanical properties to substrates.

SUMMARY OF THE INVENTION

Aspects of the invention are directed to polyester materials, and methods for making the polyester materials, polyester solutions and methods for making polyester solutions, and for binder materials and articles of manufacture utilizing the polyester materials.

In one aspect, a process is provided for preparing a polyester solution, including mixing monomers of at least one organic acid containing at least three carboxylic groups and at least one multi-hydroxyl alcohol containing at least three hydroxyl groups to form a reaction mixture, heating the reaction mixture to a first temperature, polymerizing the monomers at the first temperature until reaching an acid value from about 200 to about 400 mg KOH/g, adjusting the temperature to a second temperature less than the first temperature, and charging water to the reaction mixture to form a polyester solution. In another aspect, a method for forming an article of manufacture is provided including applying to a fibrous material, the polyester solution.

In another aspect, an article of manufacture is provided including a substrate and a polyester material, wherein the polyester material is formed from the co-polymerization of at least one organic acid containing at least three carboxylic groups and at least one multi-hydroxyl alcohol containing at least three hydroxyl groups, and the substrate comprises a fibrous material.

In another aspect, a binder material is provided, and the binder material is prepared using a formulation comprising a polyester material formed from at least one organic acid containing at least three carboxylic groups and at least one multi-hydroxyl alcohol containing at least three hydroxyl groups, and a cross-linking agent selected from the group consisting of a melamine-containing resin, a poly(N-methylolacrylamide)-containing material, melamine, an acrylic polymer, and combinations thereof.

In another aspect, a process is provided for forming a binder material, including forming a polyester solution, comprising mixing monomers of at least one organic acid containing at least three carboxylic groups and at least one multi-hydroxyl alcohol containing at least three hydroxyl groups to form a reaction mixture, heating the reaction mixture to a first temperature, polymerizing the monomers at the first temperature until reaching an acid value from about 200 to about 400 mg KOH/g, and adjusting the temperature to a second temperature less than the first temperature, and adding a cross-linking agent selected from the group consisting of a melamine-containing resin, a poly(N-methylolacrylamide)-containing material, melamine, an acrylic polymer, and combinations thereof, to the polyester solution.

In another aspect, an article of manufacture is provided including a substrate and a binder material, wherein the substrate is selected from the group consisting of glass fibers, mineral fibers (mineral wool), polyester fibers, cellulose materials, and combinations thereof, the binder material functions to adhere the substrate together into or within the article of manufacture, and the binder material is prepared using a formulation comprising a polyester material formed from at least one organic acid containing at least three carboxylic groups and at least one multi-hydroxyl alcohol containing at least three hydroxyl groups and a cross-linking agent selected from the group consisting of a melamine-containing resin, a poly(N-methylolacrylamide)-containing material, melamine, an acrylic polymer, and combinations thereof.

In another aspect, a binder material is provided, and the binder material is prepared using a formulation including a polyester material formed from at least one organic acid containing at least three carboxylic groups and at least one multi-hydroxyl alcohol containing at least three hydroxyl groups, vinyl alcohol containing polymer, an aldehyde compound, and an acrylic polymer.

In another aspect, a process is provided for forming a binder material, including forming a polyester solution, comprising mixing monomers of at least one organic acid containing at least three carboxylic groups and at least one multi-hydroxyl alcohol containing at least three hydroxyl groups to form a reaction mixture, heating the reaction mixture to a first temperature, polymerizing the monomers at the first temperature until reaching an acid value from about 200 to about 400 mg KOH/g, and adjusting the temperature to a second temperature less than the first temperature, and adding vinyl alcohol containing polymer, an aldehyde compound, and an acrylic polymer, to the polyester solution.

In another aspect, an article of manufacture is provided including a substrate and a binder material, wherein the substrate is selected from the group consisting of glass fibers, mineral fibers (mineral wool), polyester fibers, cellulose materials, and combinations thereof, the binder material functions to adhere the substrate together into or within the article of manufacture, and the binder material is prepared using a formulation comprising a polyester material formed from at least one organic acid containing at least three carboxylic groups and at least one multi-hydroxyl alcohol containing at least three hydroxyl groups, vinyl alcohol containing polymer, an aldehyde compound, and an acrylic polymer.

In another aspect, a binder material is provided, and the binder material is prepared using a formulation including a polyester material formed from at least one organic acid containing at least three carboxylic groups and at least one multi-hydroxyl alcohol containing at least three hydroxyl groups, and a cross-linking agent selected from the group consisting of a melamine-containing resin, a poly(N-methylolacrylamide)-containing material, and combinations thereof.

In another aspect, a process is provided for forming a binder material, including forming a polyester solution, including mixing monomers of at least one organic acid containing at least three carboxylic groups and at least one multi-hydroxyl alcohol containing at least three hydroxyl groups to form a reaction mixture, heating the reaction mixture to a first temperature, polymerizing the monomers at the first temperature until reaching an acid value from about 200 to about 400 mg KOH/g, and adjusting the temperature to a second temperature less than the first temperature; and adding a cross-linking agent selected from the group consisting of a melamine-containing resin, a poly(N-methylolacrylamide)-containing material, and combinations thereof, to the polyester solution.

In another aspect, an article of manufacture is provided including a substrate and a binder material, wherein the substrate is selected from the group consisting of glass fibers, mineral fibers (mineral wool), polyester fibers, cellulose materials, and combinations thereof, the binder material functions to adhere the substrate together into or within the article of manufacture, and the binder material is prepared using a formulation comprising a polyester material formed from at least one organic acid containing at least three carboxylic groups and at least one multi-hydroxyl alcohol containing at least three hydroxyl groups, and a cross-linking agent selected from the group consisting of a melamine-containing resin, a poly(N-methylolacrylamide)-containing material, and combinations thereof.

In another aspect, a binder material is provided, and the binder material is prepared using a formulation including a polyester material formed from at least one organic acid containing at least three carboxylic groups and at least one multi-hydroxyl alcohol containing at least three hydroxyl groups, a formaldehyde-free aldehyde component, and melamine, a melamine derivative, or both.

In another aspect, a process is provided for forming a binder material, including forming a polyester solution, comprising mixing monomers of at least one organic acid containing at least three carboxylic groups and at least one multi-hydroxyl alcohol containing at least three hydroxyl groups to form a reaction mixture, heating the reaction mixture to a first temperature, polymerizing the monomers at the first temperature until reaching an acid value from about 200 to about 400 mg KOH/g, and adjusting the temperature to a second temperature less than the first temperature, adding melamine, a melamine derivative, or both to the polyester solution, and adding an aldehyde compound to the polyester solution.

In another aspect, an article of manufacture is provided including a substrate and a binder material wherein the substrate is selected from the group consisting of glass fibers, mineral fibers (mineral wool), polyester fibers, cellulose materials, and combinations thereof, the binder material functions to adhere the substrate together into or within the article of manufacture, and the binder material is prepared using a formulation including a polyester material formed from at least one organic acid containing at least three carboxylic groups and at least one multi-hydroxyl alcohol containing at least three hydroxyl groups, an aldehyde compound, and melamine, a melamine derivative, or both.

DESCRIPTION OF THE PREFERRED EMBODIMENTS

Embodiments of the invention are directed to forming a polyester material, and to forming binder materials incorporating the polyester materials described herein.

In one embodiment of the invention, a process is provided for preparing a polyester material, including mixing monomers of at least one organic acid containing at least three carboxylic groups and at least one multi-hydroxyl alcohol containing at least three hydroxyl groups to form a reaction mixture, and polymerizing the monomers at the first temperature until reaching a desired acid value. A polyester solution may then be formed by adjusting the temperature to a second temperature less than the first temperature, and charging water to the mixture. Optionally, the organic acid and the multi-hydroxyl alcohol may be reacted in the presence of a catalyst. Any heterogeneous catalyst used in the reaction may be removed from the polyester solution. The process described herein is believed to produce a water soluble polyester material with relatively high molecular weight and is free of formaldehyde.

The polyester material formation process begins with providing at least one organic acid containing at least three carboxylic groups and at least one multi-hydroxyl alcohol containing at least three hydroxyl groups to form a reaction mixture, which monomers are then reacted to form a polyester material. Optionally, then organic acid and the multi-hydroxyl alcohol may be provided together in the presence of a catalyst to form the reaction mixture.

The organic acid containing at least three carboxylic groups may be one or more organic polyacids containing at least three carboxylic groups each including and are not limited to, materials such as triacids and acids having four or more carboxylic acid groups. Examples of suitable organic acids include, and are not limited to, citric acid. The organic acid may be in an anhydrous form, such as anhydrous organic acid. The organic acid may comprise from about 50 wt. % to about 80 wt. % of the reaction mixture. The organic acid may comprise from about 50 wt. % to about 80 wt. % of the polymer. Alternatively, one or more organic acids with less than three carboxylic groups, such as mono-acids and diacids, may be used in combination with the at least one organic acid containing at least three carboxylic groups.

The multi-hydroxyl alcohol containing at least three hydroxyl groups may be one or more polyols containing at least three hydroxyl groups each selected from the group of glycerol, trimethylolpropane, trimethyolethane, 2,2,4-trimethyl-1,3-pentadiol, pentaerythritol, sorbitol, and combinations thereof. The multi-hydroxyl alcohol may comprise from about 20 wt. % to about 50 wt. % of the reaction mixture. The multi-hydroxyl alcohol may comprise from about 20 wt. % to about 50 wt. % of the polymer. Alternatively, one or more diols may be used in combination with the multi-hydroxyl alcohol containing at least three hydroxyl groups.

The multi-hydroxyl alcohol may further have one or more amine substituent group, one or more carboxymethyl substituent group, or both. An example of a multi-hydroxyl alcohol having one or more amine substituent group, one or more carboxymethyl substituent group is an alkanolamine having three or more hydroxyl groups. Alkanoamines are chemical compounds that carry hydroxy (—OH) and/or tertiary amino (—NR$_2$) functional groups on an alkane backbone. Examples of suitable alkanoamines are triethanolamine, triisopropanolamine or combinations thereof. Alternatively, the multi-hydroxyl alcohol is free of an amine substituent group, free of a carboxymethyl substituent group, or free of both substituent groups.

The organic acid and the multi-hydroxyl alcohol may be provided to the reaction mixture in a molar ratio of organic acid to multi-hydroxyl alcohol from 1:3 to 3:1, such as from 0.9:1 to 1:0.9.

The optional catalyst may be a Lewis acid catalyst. Suitable Lewis acid catalyst may be selected from the group consisting of butylstannoic acid, stannous bromide, ferric chloride, zinc chloride, zinc bromide, aluminum chloride, and combinations thereof. The Lewis catalyst may be a heterogeneous catalyst, such as butylstannoic acid, or a homogeneous catalyst, such as stannous bromide, ferric chloride, zinc chloride, zinc bromide, aluminum chloride, and combinations thereof. The catalyst, if present, may comprise from about 0.01 wt. % to about 2 wt. %, such as from about 0.02% to about 0.2 wt. %, of the reaction mixture.

Optionally, a vinyl alcohol containing polymer may be used in the reaction mixture. The vinyl alcohol containing polymer may be polyvinyl alcohol (PVOH or PVA), a derivative thereof or a co-polymer thereof. The polyvinyl alcohol may be present in the reaction mixture in an amount from about 0.1% to about 20% by weight, such as about 5% to about 13%, based on the total weight of the reaction mixture. The polyvinyl alcohol may have a molecular weight from about 10,000 to about 186,000, such as from about 13,000 to about 23,000. Polyvinyl alcohol (PVA) is prepared by the hydrolysis of poly(vinyl acetate). Depending on the degree of hydrolysis PVA is usually classified into two classes namely, partially hydrolyzed (86-94%) and fully hydrolyzed (>98%) Derivatives of polyvinyl alcohol may include vinyl-alcohol-containing co-polymers.

Examples of suitable polyvinyl alcohols include, but are not limited to, SELVOL™ 103 polyvinyl alcohol, SELVOL™ 418 polyvinyl alcohol, SELVOL™ 502 polyvinyl alcohol, SELVOL™ 205 polyvinyl alcohol, and combinations thereof. The polyvinyl alcohol may be in the solid form or as an aqueous solution. For example, polyvinyl alcohol (PVOH) may be provided in an aqueous solution of 20% PVOH SELVOL™ 103 polyvinyl alcohol, which is commercially available from Sekisui Specialty Chemicals, Calvert City, Ky.

The reaction mixture may be heated and maintained at a first temperature from about 100° C. to about 200° C., for example about 140° C. It is believed that at this portion of the process that the monomers react to form a prepolymer. The reaction mixture may further include water, either separately or as part of a solution of a component.

The reaction is continued at the first temperature until the acid value of the reaction mixture is from about 200 to about 400 mg KOH/g, such as from about 230 to about 300 mg KOH/g, for example from about 240 to about 270 mg KOH/g. The acid value, or acid number, is the mass of potassium hydroxide (KOH) in milligrams that is required to neutralize one gram of chemical substance, and accordingly, the acid value is a measure of the amount of carboxylic acid groups in a chemical compound. The acid value is determined using the ASTM D-1639 test method.

The reaction may be performed for any period of time to achieve the desired acid value. For example, the reaction may be performed from about 1.5 hours to about 8 hours, such as from about 2 hours to about 3 hours.

The reaction mixture is then reduced to a second temperature less than the first temperature. The second temperature may be from about 80° C. to about 100° C., for example about 90° C. Performing the reaction until the described acid values herein are reached, and then reducing the temperature, allows for formation of a water-soluble polyester material. It is believed that the change of temperature at the acid values described herein prevents or limits the prepolymer from further condensing. If the reaction is allowed to continue, the prepolymer will further condense to form a thermoset polyester with a crosslinking structure, which is not soluble in water and many common solvents.

The reaction mixture having the formed polyester material may then be charged with water, and any catalyst may be removed, to form a polyester solution or dispersion. The polyester solution may comprise from about 20% to about 85% by weight of water. Alternatively, the polyester material solution may have a solids content from about 5 wt. % to about 80 wt. %, such as from about 20 wt. % to about 66 wt. % of the solution.

The polyester material may have a molecular weight (MW) from about 1,000 to about 10,000, such as from about 2,000 to about 5,000. The polyester material may have a glass transition temperature (Tg) from about −20° C. to about 20° C., for example, about −14° C. The polyester material is water-soluble. The polyester material may have an acid value from about 200 to about 400 mg KOH/g, such as from about 230 to about 300 mg KOH/g, for example from about 240 to about 270 mg KOH/g. The polyester material is free of formaldehyde.

When the polyester further condensed at an elevated temperature, the polyester will form a thermoset material that has been observed to have good mechanical properties and excellent chemical resistance as shown in the Examples and Tables below. The cured polyester may have a glass temperature (Tg) from about 40° C. to about 80° C., for example, about 55° C.

Additionally, the polyester material is observed to be highly branched as observed by the polyester material having a high acid value and the use of the multifunctional acid and multifunctional alcohol. The polyester material has been observed to have a density from about 1.1 g/cm$^3$ to about 1.2 g/cm$^3$. Highly branched polymers may be referred to as hyper-branched polymer, which hyperbranched polymers have highly branched molecular architecture and a multitude of reactive end-groups, such as hydroxyl and carboxylic groups, resulting in a highly crosslinking structure.

The polyester material solution may have a viscosity from about 5 cps to about 2000 cps, such as from about 300 cps to about 500 cps in 66% solids content. The polyester material solution may have a pH level from about 1 to about 3, such as from about 1.0 to about 1.9.

The polyester materials described herein are useful in preparing articles of manufacture where the polyester materials function to bind or to adhere substrates together. An article of manufacture may be formed by applying the polyester material to a substrate. The substrate may be in the form of a fibrous material. The fibrous material may comprise glass fibers, mineral fibers (mineral wool), polyester fibers, cellulose materials, and combinations thereof. The fibrous material may comprise a non-woven fibrous material selected from the group consisting of fiberglass mats, mineral fibers (mineral wool), polyester fibers, non-woven glass fiber paper, cellulose materials, and cellulose fiber, and combinations thereof. The fibrous material may comprise from about 70 wt. % to about 95 wt. %, such as from 78 wt. % to about 85 wt. % of the article of manufacture.

The polyester material described herein may be cured before or after application to a substrate, such as the fibrous material described herein. The polyester material may be cured at temperatures from about 176° C. (350° F.) to about 233° C. (450° F.), such as from 191° C. (376° F.) to about 220° C. (430° F.), for example, from about 204° C. (400° F.) to about 220° C. (430° F.). In one embodiment, the curing process may be performed from about 1 to about 6 minutes, such as from about 1 to 3 minutes. In one embodiment, the wet web strength of the binder and substrate may be from about 180 g to about 400 g, such as from about 200 g to about 350 g, for example, from about 250 g to about 350 g after application of the binder and before the curing the substrate.

The polyester materials described herein have been observed in the glass microfiber paper experiments described herein as having equivalent or improved mechanical properties as urea-formaldehyde resins. The polyester materials have been observed to have tensile strengths from about 12 MPa to about 16 MPa, such as from about 13.8 MPa to about 15.3 MPa.

The polyester materials described herein have been observed in the glass mat experiments described herein as having good mechanical properties and excellent solvent resistances, for example, the cured polyester is not soluble and does not exhibit visible swelling in acetone, THF, and methanol, which indicates that the polyester materials described herein (PGC) is believed to have a high crosslink density. Swelling is an observable phenomenon in which a crosslinked polymer having a network structure interacts with a solvent, such that when the solvent enters into the polymer, the polymer volume increases and the network junctions move away. The total volume of the polymer increases to that of the network and the solvent. The degree to which the volume increases depends on the degree of cross-linking.

The polyester materials have been observed to have dry tensile strengths from about 40 lbf/1.5 inch to about 80 lbf/1.5 inch, such as from about 44 lbf/1.5 inch to about 55 lbf/1.5 inch. The polyester materials have been observed to have wet tensile strengths from about 3 lbf/1.5 inch to about 40 lbf/1.5 inch, such as from about 17 lbf/1.5 inch to about 22 lbf/1.5 inch. The polyester materials have been observed to have loss on ignition (LOI) percentages from about 17% to about 21%, such as from about 18% to about 20.5%.

The polyester materials may be further reacted with cross-linking agents to form binder materials. Suitable cross-linking agents include a melamine-containing resin, a poly(N-methylolacrylamide)-containing material, melamine, acrylic polymers, and combinations thereof. The polyester material may be free of epoxy polymers, free of isocyanates, or both.

Additional materials including an aldehyde compound, polyvinyl alcohol, and combinations thereof, may be used with the cross-linking agents to form the binder material. The polyester material may comprise from about 50 wt. % to about 99.9 wt. % of the binder material. The cross-linking agents may comprise from about 0.1 wt. % to about 50 wt. % of the binder material. The additional materials may comprise from about 0.1 wt. % to about 20 wt. % of the binder material. The polyester material, the cross-linking agents, and the additional materials are added to amount to 100 wt. % of the binder material.

In one embodiment of the binder materials, the polyester material described herein may be combined with water-based melamine-containing resins, poly(N-methylolacrylamide)-containing materials, and combinations thereof, to form cured binder materials. Suitable melamine-containing resins include trimethoxymethylmelamine resin, dimethylolmethylmelamine resin, and dimethylolmelamine resin, and combinations thereof. Examples of melamine-containing resins include Astro Mel NW-3A resin, Astro Celrez DR-3 resin, Astro Celrez LA-15 resin, Astro Mel 400 resin, and combinations thereof, all of which are commercially available from Momentive Specialty Chemicals Inc., of Morganton, N.C. The melamine-containing resin may comprise from about 5.0 wt. % to about 20.0 wt. %, such as from about 10.0 wt. % to about 12.5 wt. % of the binder material.

The cured binder materials made from polyester materials and melamine-containing resins have been observed to have dry tensile strengths from about 40 lbf/1.5 inch to about 90 lbf/1.5 inch, such as from about 60 lbf/1.5 inch to about 80 lbf/1.5 inch; have wet tensile strengths from about 20 lbf/1.5 inch to about 60 lbf/1.5 inch, such as from about 20 lbf/1.5 inch to about 54 lbf/1.5 inch; and have a loss on ignition (LOI) percentage from about 14% to about 21%, such as from about 15% to about 21%.

For the poly(N-methylolacrylamide)-containing binder material, the polyester material described herein may be mixed with poly(N-methylolacrylamide)-containing material, such as in an emulsion, to form cured binder materials. The poly(N-methylolacrylamide)-containing emulsion may comprise poly(N-methylolacrylamide) (PNMAM) polymers (homopolymers) or copolymers including poly(N-methylolacrylamide), such as poly(N-methylolacrylamide)-containing random or block copolymers based on the N-methylolacrylamide monomer. Examples of poly(N-methylolacrylamide)-containing emulsions include RHOPLEX™ GL 720, RHOPLEX™ GL618, and combinations thereof. The poly(N-methylolacrylamide)-containing emulsion may have from 30 wt. % to 60 wt. % water, for example, RHOPLEX™ GL 720 is 45 wt % poly(N-methylolacrylamide)-containing material with water. The poly(N-methylolacrylamide)-containing material may comprise from about 5.0 wt. % to about 30.0 wt. %, such as from about 10.0 wt. % to about 15.0 wt. % of the binder material. RHOPLEX™ GL emulsions commercially available from Dow Chemical.

The cured binder materials made from polyester materials and poly(N-methylolacrylamide)-containing materials have been observed to have dry tensile strengths from about 40 lbf/1.5 inch to about 100 lbf/1.5 inch, such as from about 60 lbf/1.5 inch to about 80 lbf/1.5 inch; have wet tensile strengths from about 20 lbf/1.5 inch to about 50 lbf/1.5 inch, such as from about 30 lbf/1.5 inch to about 46 lbf/1.5 inch; and have a loss on ignition (LOI) percentage from about 18% to about 21%, such as from about 18.5% to about 20.5%.

The binder material of the polyester material described herein combined with water-based melamine-containing resins, poly(N-methylolacrylamide)-containing materials, and combinations thereof may further include polyvinyl alcohol, and if present, may comprise from about 0.1 wt. % to about 20 wt. %, such as from about 5 wt. % to about 13 wt. % of the binder material.

In another embodiment of the binder materials, the polyester material described herein may be combined with melamine, melamine derivatives, or both, to form cured binder materials. The melamine, the melamine derivatives, or both may comprise from about 5 wt. % to about 23 wt. %, such as from about 11 wt. % to about 13 wt. % of the binder material. The polyester material and melamine, melamine derivatives, or both, may be mixed in the presence of an additional material, an aldehyde, as described herein, such as glyoxal. The molar ratio of melamine to aldehyde may be at least 1:1, such as from 1:1.1 to 1:1.5. The aldehyde compound, if present, may comprise from about 5.0 wt % to about 12.0 wt. %, such as from about 5.4 wt. % to about 11.0 wt. % of the binder material. The binder material may further include polyvinyl alcohol, and if present, may comprise from about 0.1 wt. % to about 20 wt. %, such as from about 5 wt. % to about 13 wt. % of the binder material.

The cured binder materials made from polyester materials and melamine have been observed to have dry tensile strengths from about 40 lbf/1.5 inch to about 100 lbf/1.5 inch, such as from about 59 lbf/1.5 inch to about 75 lbf/1.5 inch; have wet tensile strengths from about 20 lbf/1.5 inch to about 70 lbf/1.5 inch, such as from about 33 lbf/1.5 inch to about 49 lbf/1.5 inch; and have a loss on ignition (LOI) percentage from about 15% to about 25%, such as from about 17% to about 21%.

In another embodiment of the binder materials, the polyester material described herein may be mixed with an acrylic polymer, to form the cured binder materials. The acrylic polymers may be formaldehyde-free acrylic polymers. Suitable acrylic polymers include polyacrylic acid, polyacrylic ether polymer, polyacrylic ester polymer, polyacrylic amide polymer, and combinations thereof. Examples of acrylic polymers include Aquaset™ 100 solution, Aquaset™ 600 solution, and combinations thereof. The acrylic polymers may be provided as a solution, for example, Aquaset™ 100 solution is 50% acrylic polymers solution. The acrylic polymers may comprise from about 0.1 wt. % to about 20 wt. %, such as from about 2 wt. % to about 10 wt. % of the binder material.

The polyester material mixed with an acrylic polymer, and may include additional materials, such as an aldehyde and polyvinyl alcohol. The polyester material and acrylic polymer may be mixed in the presence of an aldehyde as described herein, such as glyoxal, a polyvinyl alcohol as described herein, or both. The aldehyde compound, if present, may comprise from about 5.0 wt. % to about 12.0 wt. %, such as from about 5.4 wt. % to about 11.0 wt. % of the binder material. The binder material may further include polyvinyl alcohol, and if present, may comprise from about 0.1 wt. % to about 20 wt. %, such as from about 5 wt. % to about 13 wt. % of the binder material.

The cured binder materials made from polyester materials and acrylic polymers have been observed to have dry tensile strengths from about 40 lbf/1.5 inch to about 110 lbf/1.5 inch, such as from about 74 lbf/1.5 inch to about 94 lbf/1.5 inch; have wet tensile strengths from about 30 lbf/1.5 inch to about 70 lbf/1.5 inch, such as from about 41 lbf/1.5 inch to about 58 lbf/1.5 inch; and have a loss on ignition (LOI) percentage from about 18% to about 21%, such as from about 19% to about 20%.

The aldehyde compound may comprise one or more formaldehyde-free aldehyde compounds, such as a dialdhyde compound. Examples of suitable dialdehyde compounds include glyoxal, malondialdehyde, succindialdehyde, glutaraldehyde, and combinations thereof. The aldehyde compound may be provided as a solution, for example, glyoxal is provided at about 40% glyoxal solution. The aldehyde compound, if present, may comprise from about 5 wt. % to about 20 wt. %, such as from about 5.4 wt. % to about 11 wt. % of the binder material. The aldehyde compound addition is believed to improve the solubility of the melamine resins, melamine, and crosslink with polyvinyl alcohol and hydroxyl group of the polyester in the solution for the binder materials.

The vinyl alcohol containing polymer is described herein. The polyvinyl alcohol may be provided as a solution, for example, SELVOL™ 502 is provided as an 18% to 20% polyvinyl alcohol solution. The polyvinyl alcohol, if present may comprise from about 0.1 wt. % to about 20 wt. %, such as from about 5 wt. % to about 13 wt. % of the binder material.

Water, as necessary, may be separately added to form the binder material.

Optional binder catalytic materials may also be included to form the respective binder materials from the polyester materials described herein. The optional binder catalyst may also be an amine-based catalyst. Suitable amine-based catalysts may include ammonium nitrate, ammonium chloride, ammonium sulfate, and combinations thereof. Amine-based salt may be as a latent catalyst, which will be active when it is thermally decomposed at a certain temperature. An example of an amine-based catalyst is Fentak CT 0234, which is commercially available from Momentive Specialty Chemicals Inc., of Morganton, N.C. The binder catalyst, if present, may comprise from about 0.1 wt. % to about 2.0 wt. %, such as from about 0.14 wt. % to about 0.5 wt. % of the binder material.

The optional binder catalyst may also be an oxy acid, which include any mineral acid containing oxygen. Suitable oxy acids include, and are not limited to, nitric acid, sulfuric acid, phosphoric acid, derivatives thereof, and combinations thereof. Examples of the optional binder catalytic materials include hypophosphorous acid, phosphorous acid, phosphoric acid, and combinations thereof. The optional binder catalytic materials may comprise from about 0.5 wt. % to about 5 wt. %, such as from about 2 wt. % to about 4 wt. % of the binder material.

In one embodiment of a process to form a binder material having melamine resin, the binder material may be formed by the following process. A polyester material as described herein is provided in solution form, and optionally, may be mixed with a poly(vinvl alcohol). The solution may contain from 10 wt. % to 80 wt. % polyester solution in water, such as from 20 wt. % to 66 wt. % polyester solution in water. Any additives including catalysts, any optional aldehyde compound, and water may then be added to the polyester material solution. The crosslinking material, such as the melamine resin, was charged into the solution with agitation. The process was performed at atmospheric pressure and temperature.

In one embodiment of a process to form a binder material having poly(N-methylolacrylamide)-containing material, the binder material may be formed by the following process. A polyester material as described herein is provided in solution form, and optionally, may be mixed with a poly(vinvl alcohol). The solution may be from 20 wt. % to 80 wt. % polyester solution in water. An additive, any optional aldehyde compound, and water may then be added to the polyester material solution. The crosslinking material, such as the poly(N-methylolacrylamide)-containing material, was charged in the solution with agitation. The process was performed at atmospheric pressure and temperature.

In another embodiment of a process to form a binder material having poly(N-methylolacrylamide)-containing material, the binder material may be formed by the following process. A polyester material as described herein is provided in solution form, and poly(N-methylolacrylamide)-containing material was charged in the solution with agitation. The process was performed at atmospheric pressure and temperature.

In one embodiment of a process to form a binder material having melamine, the binder material may be formed by the following process. A polyester material as described herein is provided in solution form and mixed with melamine powder. The mixture was heated with agitation, such as from about 50° C. to about 90° C., for example at 70° C., for between about 0.5 hours and 3 hours, for example about 1 hour. An aldehyde compound, such as glyoxal, is added, and the final solution is continuously stirred at from about 50° C. to about 90° C., for example at 70° C. from, about 1 minute to about 20 minutes, such as from about 5 to about 10 minutes. The process was performed at atmospheric pressure. Optionally, polyvinyl alcohol may be mixed with the final solution at ambient temperature.

In this embodiment, melamine dissolves in the polyester solution (PGC) first at 80° C. and then glyoxal is added in the ratio 1:1 to obtain a clear solution at ambient temperature. It is believed that melamine reacts with the carboxylic group of PGC polyester in the presence of small amount of glyoxal to form a melamine "salt" (PGCM). It has been observed that melamine dissolves in PGC solution at about 80° C., the pH of PGCM increases as the amount of melamine increases, and the PGCM-based binder improves wet tensile strength as compared to PGC and it is believed that melamine may react with carboxylic group of PGCM during curing at about 200° C.

In another embodiment of a process to form a binder material having melamine, the binder material may be formed by the following process. A polyester material as described herein is provided in solution form and mixed with melamine powder. The mixture was heated with agitation, such as from about 50° C. to about 90° C., for example at 70° C., for between about 0.5 hours and 3 hours, for example about 1 hour. After the solution was cooled to ambient temperature, an aldehyde compound, such as glyoxal, polyvinyl alcohol, and water is added. The process was performed at atmospheric pressure.

In one embodiment of a process to form a binder material having an acrylic polymer, the binder material may be formed by the following process. A polyester material as described herein, water, an acrylic polymer solution, an aldehyde compound, and polyvinyl alcohol are mixed with stirring at room temperature and atmospheric pressure. Optionally, the polyvinyl alcohol may be formed by dilution in water to 20% PVA by heating in water, such as at about 80° C. for a period of time, such as about one hour, before adding as described previously. The process may also be free of an epoxy polymer, free of isocyanates, or both.

EXAMPLES

The following examples are provided to illustrate aspects of the invention. The examples are not intended to limit the scope of the invention and they should not be so interpreted. Amounts are in weight parts or weight percentages unless otherwise indicated.

Polyester Material Examples

In the following Examples 1-7 and Tables 1-4, the components are identified as follows. The glycerol is 99+ wt. % glycerol and is commercially available from Sigma-Aldrich of St. Louis, Mo. 98% trimethylolpropane was purchased from Sigma-Aldrich. Citric acid is anhydrous citric acid, which is commercially available. Fascat 9100 catalyst is a heterogeneous tin catalyst, butylstannoic acid, and is commercially available from Momentive Performance Materials of Tarrytown, N.Y. OC9501 Glass Fiber is an E-glass based glass fiber commercially available from Owens Corning of Toledo, Ohio. Whatman GF/A Glass Microfiber Filter Paper is commercially available from Fisher Scientific of Pittsburg, Pa. Rhodia VP-532 is alkyl amine ethoxylated tallow, and is commercially available from the Rhodia Group of Cranbury, N.J. Superfloc A-130 flocculant is an anionic polyacrylamide, and is commercially available from Cytec Industries, Inc. of Woodland Park, N.J. Fentak CT0234 catalyst is an amine salt, aliphatic amine, and ammonium salt composition, and is commercially available from Momentive Specialty Chemicals Inc., of Morganton, N.C. SELVOL™ 502 is a polyvinyl alcohol commercially available from Sekisui Specialty Chemicals, Calvert City, Ky.

Example 1

Synthesis of Poly(glyceryl-citrate) (PGC) was performed as follows. To a four-necked round-bottomed flask equipped with a mechanical stirrer, a thermometer, a nitrogen inlet, a water condenser and a Dean-Stark water receiver was added anhydrous citric acid (640.0 g), 99% glycerol (320.0 g), and Fascat 9100 (1.9 g). The mixture was heated to 140° C. for about 3 hours under nitrogen atmosphere. The mixture became a clear liquid and a by-product, water, was collected in the Dean-Stark water receiver. Bubbles and foams were observed in the later stage of the polymerization. The reaction was cooled to 90° C. when the acid value (acid number) ranged from 230 to 270 mg KOH/g. Water was charged into the flask to form a colorless solution. The heterogeneous tin catalyst was removed by filtration.

Example 2

Synthesis of Poly(glyceryl-trimethylolpropane-citrate)-A (PGTC-A) was performed as follows. To a four-necked round-bottomed flask equipped with a mechanical stirrer, a thermometer, a nitrogen inlet, a water condenser and a Dean-Stark water receiver was added anhydrous citric acid (168.0 g), 98% trimethylolpropane (40.0 g), 99% glycerol (60.0 g), and Fascat 9100 (0.06 g). The mixture was heated to 140° C. for 2 hours under nitrogen atmosphere. The mixture became a clear liquid and a by-product, water was collected in the Dean-Stark water receiver. Bubbles and foams were observed in the later stage of the polymerization. The reaction was cooled to 90° C. when acid value ranged from 230 to 270 mg KOH/g. Water was charged into the flask to form a colorless solution. The heterogeneous tin catalyst was removed by filtration.

Example 3

Synthesis of Poly(glyceryl-trimethylolpropane-citrate)-B (PGTC-B) was performed as follows. To a four-necked round-bottomed flask equipped with a mechanical stirrer, a thermometer, a nitrogen inlet, a water condenser and a Dean-Stark water receiver was added anhydrous citric acid (168.0 g), 98% trimethylolpropane (60.0 g), 99% glycerol (40.8 g), and Fascat 9100 (0.06 g). The mixture was heated to 140° C. for 2 hours under nitrogen atmosphere. The mixture became a clear liquid and a by-product, water was collected in the Dean-Stark water receiver. Bubbles and foams were observed in the later stage of the polymerization. The reaction was cooled to 90° C. when acid value ranged from 230 to 270 mg KOH/g. Water was charged into the flask to form a colorless solution. The heterogeneous Tin catalyst was removed by filtration.

Example 4

Synthesis of Poly(trimethylolpropane-citrate) (PTC) was performed as follows. To a four-necked round-bottomed flask equipped with a mechanical stirrer, a thermometer, a nitrogen inlet, a water condenser and a Dean-Stark water receiver was added anhydrous citric acid (156.0 g), 98% trimethylolpropane (120.0 g), and Fascat 9100 (0.06 g). The mixture was heated to 140° C. for 2 hours under nitrogen atmosphere. The mixture became a clear liquid and a by-product, water was collected in the Dean-Stark water receiver. Bubbles and foams were observed in the later stage of the polymerization. The reaction was cooled to 90° C. when acid value ranged from 230 to 270 mg KOH/g. Water was charged into the flask to form a colorless solution. The heterogeneous tin catalyst was removed by filtration.

Example 5

The evaluation of poly(glyceryl-citrate) on binder-free glass fiber paper was performed by preparation of sample of Whatman GF/A glass microfiber filter paper was performed as follows. An 8×19 cm rectangular Whatman GF/A glass microfiber filter paper was saturated with 22% binder solution made in EXAMPLE 1 by using a drawdown bar. The paper with the binder was then cured on a Methis Labdryer at 191° C. (375° F.) for 3 minutes. The tensile strength of the sample was measured on an Instron™ 6655 using ASTM-5035. Tensile testing, also known as tension testing, is a fundamental materials science test in which a sample is subjected to uniaxial tension until failure, and in the current experiments, failure is by breaking of the specimen.

Example 6

Evaluation of PGC, PTC, or PGTC binder on Glass Mat Hand Sheets was performed as follows. Treatment of Glass Fiber. 7.9 g of wet glass fiber OC9501 with an average 19 mm length and 18-micron diameter was immersed in 40 g of water with 0.6 g of Rhodia VP-532/SPB for 2 hours. Glass fiber OC9501 was provided by Owens Corning. Rhodia VP-532 was obtained from Rhodia Group.

The preparation of the wet glass mat was performed as follows. The glass fiber was dispersed in 27 liters of warm water about 50° C. in a 54-liter vessel equipped with a mechanical stirrer under agitation at 500 rpm for 30 seconds, and then 400 g of 0.2% of Cytec Superfloc A-130 Flocculent solution was added into the vessel and mixed for 60 seconds. The glass fiber slurry was introduced onto a 11.8×11.8×11.0 inch (30×30×28 cm) fabric mat casting mode equipped with a wire support mesh with a plastic fabric. The wet glass mat with the plastic fabric was passed through a vacuum slot to remove excess water. A 20% binder solution made from EXAMPLE 1-4 was applied on the wet glass mat, and then passed through the vacuum slot again to remove excess the binder to obtain a wet glass mat with the binder. The glass mat with was cured on Methis Labdryer at 191° C. (375° F.) for 3, or 6 minutes, or at 204° C. (400° F.), or 216° C. (420° F.), or 218° C. (425° F.) for 3 minutes.

Dry tensile strength samples were prepared as follows. The glass mat was cut in a 1.5×4.0 inch (3.8×10.2 cm) rectangular specimen. A total of eighteen specimens from the three glass mat hand sheets were measured on an Instron™ 5566 device to obtain an average measurement. Dry tensile strength units are pound force per width of the specimen in inches.

Wet tensile strength samples were prepared as follows. The specimen was soaked in water at 80° C. for 10 minutes in a Precision Microprocess Controlled 280 water bath (Thomas Scientific). Excess water in the specimen was removed with paper towel. The specimens were immediately tested on the Instron™ 6655 unit. Wet tensile strength units are pound force per width of the specimen in inches.

Example 7

PGC Modified with Poly(Vinyl Alcohol) was prepared as follows. 450 g of poly(glyceryl-citrate), 5.42 g of Fentak CT0234, 144.11 g of 20% SELVOL™ 502, 18.01 g of 40% glyoxal and 18.01 g of water were mixed with stirring. The resultant was a clear light yellow solution. The evaluation of the binder was carried out by applying the procedure in EXAMPLE 6. The binder was evaluated on microfiber filter paper and glass mat hand sheets based on the procedure in EXAMPLE 5 and 6.

The physical properties of the polyester material made in Examples 1-4 were measured and are presented in Table 1. The Molecular Weight (MW) of the polyester materials were measured on GPC Perkin Elmer 200 with a reflective index detector and dimethylformamide (DMF) was used as a mobile phase for the test. Polyethylene glycol (PEG) standards were used for calibration purposes. Viscosity was measured by a Brookfield DV-II+Pro Viscometer. The acid value was determined by acid titration conducted by Test Method ASTM D974. The solids content was measured after the liquid product was dried in oven at 180° C. for 1 hour. The results in Table 1 illustrate the variation of the polymerization of citric acid and glycerol in viscosity, pH, acid value, the amount of distilled water (a by-product) and viscosity as well as the minimum acid value measured in the reaction.

TABLE 1

Physical Properties of the Polyesters

| Sample | Mw | Viscosity, cP | pH | Acid Value, mg KOH/g | Solids (wt. %) |
|---|---|---|---|---|---|
| Example 1 PGC | 3,937 | 20.8 | 1.66 | 265 | 40 |
| Example 2 PGTC-A | 2,521 | 8.5 | 1.87 | 249 | 30 |
| Example 3 PGTC-B | 4,428 | 15.5 | 1.89 | 259 | 37 |
| Example 4 PTC | 2,147 | 11.8 | 1.89 | 232 | 36 |

The polyester materials of Examples 1 and 7, and a control urea-formaldehyde resin were used to treat the wet glass mat as in Example 6, and the results are shown in Table 2 below. As shown in Table 2, the poly(glyceryl-citrate) solution exhibits similar tensile strength on glass microfiber paper as the UF resin does. As shown in Table 3A, sample 3 (Example 7) has a higher tensile strength than sample 2 (Example 1) due to the formulation containing polyvinyl alcohol SELVOL™ 502. It has a higher tensile strength than sample 1 (UF control). FG-654A is an urea-formaldehyde product commercially available from Momentive Specialty Chemicals Inc, of Louisville, Ky.

TABLE 2

Mechanical Properties on GF/A Whatman Glass Microfiber Paper

| Sample | Tensile, MPa | Curing Condition |
|---|---|---|
| FG-654A (UF Control) | 13.80 | 191° C./3 min |
| Example 1 | 13.86 | 191° C./3 min |
| Example 7 | 15.21 | 191° C./3 min |

In Table 3A, the poly(glyceryl-citrate) resin or the poly (glyceryl-citrate) resin modified with poly(vinyl alcohol) on the glass microfiber paper, both exhibit similar dry tensile strength to urea-formaldehyde resin in dry tensile strength. FG-654A and FG-654NDF are urea-formaldehyde products commercially available from Momentive Specialty Chemicals Inc, of Louisville, Ky. RHOPLEX™ GL720 is a latex material commercially available from Dow Chemical.

TABLE 3A

Mechanical Properties on Glass Mat

| Resin | Dry tensile, (lbf/1.5 inch) | Wet tensile, (lbf/1.5 inch) | Loss on Ignition (LOI, %) | Curing Condition |
|---|---|---|---|---|
| FG-654NDF/ GL720 (Control A) | 76.91 | 51.32 | 20.4 | 191° C./3 min |
| FG-654A/ GL720 (Control B) | 67.78 | 40.43 | 20.2 | 191° C./3 min |
| PGC from EXAMPLE 1 | 44.97 | 3.01 | 20.0 | 191° C./3 min |
| PGC from EXAMPLE 1 | 50.24 | 17.24 | 20.0 | 191° C./6 min |
| PGC from EXAMPLE 1 | 55.63 | 24.84 | 20.3 | 218° C./3 min |
| PGTC-A from EXAMPLE 2 | 50.10 | 25.92 | 18.9 | 218° C./3 min |
| PGTC-B from EXAMPLE 3 | 49.81 | 25.82 | 18.8 | 218° C./3 min |
| PTC from EXAMPLE-4 | 50.12 | 18.29 | 19.1 | 218° C./3 min |
| PGC-PVA from EXAMPLE 7 | 67.55 | 30.45 | 18.7 | 218° C./3 min |

Although dry tensile strength of the polyester materials in EXAMPLE 1 and 4 has better performance than conventional water-based polyester dispersion, wet tensile strength of the polyester is lower than that of the urea-formaldehyde binder. When the polyester comprises additives, such as polyvinyl alcohol, the resultant binder exhibits good dry tensile strength and also improves wet tensile strength in EXAMPLE 7.

In an alternate version of the process, poly(glyceryl-citrate) (PGC) was formed in the absence of a catalyst as shown in Examples 1B-1E. Synthesis of poly(glyceryl-citrate) (PGC) was performed as follows. To a four-necked round-bottomed flask equipped with a mechanical stirrer, a thermometer, a nitrogen inlet, a water condenser and a Dean-Stark water receiver was added anhydrous citric acid (820.0 g), 99% glycerol (410.0 g). The mixture was heated to 125° C., 130° C., 135° C., 140° C. for about 3 to 8 hours under nitrogen atmosphere, respectably. The mixture became a clear liquid and a by-product, water, was collected in the Dean-Stark water receiver. The reaction was cooled to 90° C. when the acid value (acid number) ranged from 230 to 270 mg KOH/g. Water (512.5 g) was charged into the flask to form a colorless solution. Bubbles and foams were observed in the later stage of the polymerization as shown in Table 3B Properties of the Polyesters below. It has been observed that the polyester formation rate increases with increased processing temperature.

TABLE 3B

| Sample No. | Synthesis Temp., ° C. | Time, hour | Viscosity (66 wt %), cP | Acid value, mg KOH/g | Observations |
|---|---|---|---|---|---|
| Example 1B | 125 | 7.5 | 401 | 255 | Bubbles, no foaming, |
| Example 1C | 130 | 6.7 | 357 | 264 | Bubbles, no foaming, |
| Example 1D | 135 | 5.5 | 332 | 265 | Bubbles, no foaming, |
| Example 1E | 140 | 2.6 | 387 | 260 | A little foaming |

The binders were evaluated on glass mat hand sheets. Table 4 shows two UF binder controls that were used to establish a control range. It has been found that wet tensile strength of sample series 2 of Example 1 improved gradually when the curing temperature was increased from 191° C. (375° F.) to 218° C. (425° F.). Sample 3 was a formulation of polyester comprising PVA, which demonstrates an improved dry tensile strength and improved wet tensile strength over samples 2A-2C.

Although glass microfiber paper test is a simple method as screening the binders, it has two drawbacks; (1) it is difficult to obtain the reliable results of the wet tensile strength. (2) Tensile strength of a binder depends on adhesion to substrates. The curing conditions were at 191° C. (375° F.) for the respective samples as shown in Table 4A.

TABLE 4A

Mechanical Properties on Glass Mat Hand Sheet

| Sample No. | Material Sample | LOI, % | Wet tensile, (lbf/1.5 inch) | Dry tensile, (lbf/1.5 inch) | Curing Condition |
|---|---|---|---|---|---|
| Control A | FG654NDF/ GF720 | 20.38 | 47.64 | 71.60 | 191° C./3 min |
| Control B | FG654A/ GL720 | 20.15 | 38.12 | 63.64 | 191° C./3 min |
| 2A | Example 1 | 20 | 3.01 | 44.97 | 191° C./3 min |
| 2B | Example 1 | 20 | 17.24 | 50.24 | 191° C./6 min |
| 2C | Example 1 | 20.25 | 24.84 | 55.63 | 218° C./3 min |
| 3 | Example 7 | 18.65 | 31.03 | 68.79 | 191° C./3 min |

Example 1

Comparison

The polyester material of EXAMPLE 1 is compared to two conventional polyesters dispersion formed form a typical processes.

Conventional crosslinkable polyester dispersions are typically made in three steps; (1) synthesis of polyester resin at 180-200 C (acid value<12 mg KOH/g); (2) incorporation of trimellitic anhydride (TMA) at 180 C into the polymer; (3) dispersion of the resin in water. In these two polyesters, trimethylol propane (TMP) and trimellitic anhydride (TMA) are a triol and a triacid, respectively. The components of samples 1 and 2 of the conventional polyester materials are shown as follows in Table 4B.

TABLE 4B

| | Weight, g |
|---|---|
| Sample 1 Component | |
| Neopentylglycol (NPG) | 70.0 |
| Cyclohexanedimethanol (CHDM) | 77.8 |
| Trimethylol propane (TMP) | 23.7 |
| Fascat 9100 | 0.16 |
| Adipic acid (AA) | 52.0 |
| Isophthalic acid (IPA) | 156.0 |
| Trimellitic anhydride (TMA) | 18.2 |
| Total | 397.7 |
| N-methylpyrrolidone (NMP) | 28.2 |
| Methyl Ethyl Ketone (MEK) | 111 |
| H2O | 500 |
| Sample 2 Component | |
| Methylpropanediol (MPD) | 130.0 |
| Trimethylol propane (TMP) | 5.6 |
| Fascat 9100 | 0.4 |

TABLE 4B-continued

| | Weight, g |
|---|---|
| Adipic acid (AA) | 15.1 |
| Isophthalic acid (IPA) | 41.4 |
| Terephthalic acid (TPA) | 165.5 |
| Triemllitic anhydride (TMA) | 16.0 |
| Total | 373.5 |
| N-methylpyrrolidone (NMP) | 26.4 |
| Methyl Ethyl Ketone (MEK) | 107 |
| H2O | 450 |

For Table 4C, the abbreviations are used as follows. Acid Value is the acid value with X/Y the acid value of the first step of the reaction/the acid value of the second step of the reaction. For solubility determination, the resin was dried and cured at 180° C. for 60 min and then was tested in solvent. NMP is N-methylpyrrolidone. PED is Polyester Dispersion. PGC is Poly(glycerol-citrate).

TABLE 4C

| Sample | Molecular weight | Acid Value | Dry tensile, lbf/1.5 inch | Wet tensile, lbf/1.5 inch | Cure conditions | Solubility |
|---|---|---|---|---|---|---|
| Sample 1: PED | 26,483 | 8/35 | 10.25 | 4.65 | 375° F./ 6 min | Swelling in water, Soluble in Acetone, THF and NMP |
| Sample 2: PED | 8,122 | 7/35 | 18.42 | 10.27 | 375° F./ 6 min | Swelling in water, Soluble in Acetone, THF and NMP |
| Example 1: PGC | 2,000 | 260 | 50.24 | 14.24 | 375° F./ 6 min | Insoluble in Water, Acetone, THF and NMP |
| Example 1: PGC | 2,000 | 260 | 59.26 | 26.51 | 425° F./ 3 min | Insoluble in Water, Acetone, THF and NMP |

Table 4C illustrates that the wet tensile and dry tensile strength of the thermoset PGC resin on the glass mat are improved compared to those of conventional crosslinkable polyesters. Further, the cured polyester materials described herein are insoluble in water, acetone, THF and NMP in contrast to the swelling in water and the solubility in acetone, THF and NMP of the conventional crosslinkable polyesters. The self-crosslinkable polyester materials described herein made by 100% of a triacid and a triol is a thermoset material, and possess good mechanical properties and chemical resistances.

In the following Examples 8-14, embodiments of the polyester materials were mixed with melamine-containing resins to form a binder. Different MF resins were studied as crosslinkers in the poly(glyceryl-citrate). The formaldehyde content is much less in the binders as compared to a traditional UF or MF based binder due to the small amount of MF resin in the formulation.

In the following Examples 8-14 and Tables 5-13, the components are identified as follows if not already described herein. Astro Mel NW-3A is a partially methylated melamine-containing resin, commercially available from Momentive Specialty Chemicals, Inc. of Morganton, N.C. Astro Celrez DR-3 is a dimethylolmelamine resin commercially available from Momentive Specialty Chemicals, Inc. of Morganton, N.C. Astro Celrez LA-15 is a dimethylolmelamine commercially available from Momentive Specialty Chemicals, Inc. of Morganton, N.C. In Example 13 and 14, RHOPLEX™ GL720, an acrylic polymer emulsion product produced by Dow Chemical, was mixed with poly(glyceryl-citrate) to give a white milky liquid.

The following abbreviations may be used in the following examples and Tables: PGC is Poly(glyceryl-citrate), NW3A is Astro Mel NW-3A, PVA is Poly(vinyl alcohol), G is glyoxal, DR3 is Astro Celrez DR-3, F is Fentak CT 0234, and LA15 is Astro Celrez LA-15, and FG-654A and FG-654NDF are an urea-formaldehyde products. Poly(N-methylolacrylamide)-containing emulsion may be abbreviated as PNMAM herein.

Example 8

A poly(glyceryl-citrate) based binder made with melamine-containing resin Astro Mel NW-3A was prepared as follows. Poly(vinvl alcohol) SELVOL™ 502 solution was mixed with poly(glyceryl-citrate) solution, and then Fentak CT0234, glyoxal, and water were added into the solution. Finally, Astro Mel MN-3A was slowly charged into the solution with agitation. A light yellow solution was obtained. The formulation of the PGC-Melamine Resin of EXAMPLE 8 is shown in Table 5.

TABLE 5

| Component | Weight, part | Weight, % |
|---|---|---|
| 22.5% poly(glyceryl-citrate) | 1,850.00 | 77.09 |
| Astro Mel NW-3A | 108.13 | 4.51 |
| Fentak CT0234 | 12.51 | 0.52 |
| 18% SELVOL ™ 502 | 370.00 | 15.42 |
| 40% Glyoxal | 41.63 | 1.73 |
| H$_2$O | 17.58 | 0.73 |
| Total | 2399.85 | 100.00 |

Example 8B as shown in Table 13 is performed by the same process as Example 8 using only 22.5% poly(glyceryl-citrate) and Astro Mel NW-3A.

Example 9

A poly(glyceryl-citrate) based binder made with melamine-containing resin Astro Mel NW-3A without Fentak CT0234 was prepared and evaluated on glass mat in the same procedure in EXAMPLE 8. The binder formulation of the PGC-Melamine Resin of EXAMPLE 9 was similar to EXAMPLE 8 without Fentak CT0234, and is shown in Table 6.

TABLE 6

| Component | Weight, part | Weight, % |
|---|---|---|
| 40% poly(glyceryl-citrate) | 350.00 | 34.95 |
| Astro Mel NW-3A | 36.40 | 3.63 |
| SELVOL ™ 502 (20%) | 112.08 | 11.19 |
| 40% Glyoxal | 14.01 | 1.40 |
| H$_2$O | 489.07 | 48.83 |
| Total | 1001.56 | 100.00 |

Example 10

A poly(glyceryl-citrate) based binder made with melamine-containing resin Astro Mel NW-3A without glyoxal was prepared using the same procedure in EXAMPLE 8 for preparing a binder solution and evaluating the binder performance on glass mat. The binder formulation of the PGC-Melamine Resin of EXAMPLE 10 was similar to EXAMPLE 8 without glyoxal, and is shown in Table 7.

TABLE 7

| Component | Weight, g | Weight, % |
|---|---|---|
| 22.5% Poly(glyceryl-citrate) | 1,000.00 | 63.28 |
| Astro Mel NW-3A | 58.45 | 3.70 |
| Fentak CT0234 | 6.77 | 0.43 |
| SELVOL ™ 502 (18%) | 200.00 | 12.66 |
| H₂O | 315.08 | 19.94 |
| Total | 1580.30 | 100.00 |

Example 11

A poly(glyceryl-citrate) based binder made with melamine-containing resin Astro Celrez DR-3 of EXAMPLE 11 was prepared using the same procedure in EXAMPLE 8 for preparing a binder solution and evaluating the binder performance on glass mat, and is shown in Table 8.

TABLE 8

| Component | Weight, g | Weight, % |
|---|---|---|
| 40% poly(glyceryl-citrate) | 350.00 | 34.80 |
| Astro Celrez DR-3 | 36.40 | 3.62 |
| Fentak CT0234 | 4.22 | 0.42 |
| SELVOL ™ 502 (20%) | 112.08 | 11.14 |
| Glyoxal (40%) | 14.01 | 1.39 |
| H₂O | 489.07 | 48.62 |
| Total | 1005.78 | 100.00 |

Example 12

A poly(glyceryl-citrate) based binder made with melamine-containing resin Astro Celrez LA-15 of EXAMPLE 12 was prepared using the same procedure in EXAMPLE 8 for preparing a binder solution and evaluating the binder performance on glass mat, and is shown in Table 9.

TABLE 9

| Component | Weight, g | Weight, % |
|---|---|---|
| 40% poly(glyceryl-citrate) | 384.20 | 35.64 |
| Astro Celrez LA-15 | 51.38 | 4.77 |
| Fentak CT0234 | 4.63 | 0.43 |
| SELVOL ™ 502 (20%) | 123.04 | 11.41 |
| Glyoxal (40%) | 15.38 | 1.43 |
| H₂O | 499.46 | 46.33 |
| Total | 1078.09 | 100.00 |

Example 13

A poly(glyceryl-citrate) based binder made with RHOPLEX™ R720 resin of EXAMPLE 13 was mixed with poly(glyceryl-citrate) to give a white milky liquid, and the composition is shown in Table 10. The same procedure in EXAMPLE 8 was used to evaluate the binder performances on glass mat.

TABLE 10

| Component | Weight, part | Weight, % |
|---|---|---|
| 22.5% poly(glyceryl-citrate) | 1,165.5 | 88.9 |
| RHOPLEX ™ GL720 | 145.7 | 11.1 |
| Total | 1311.2 | 100.0 |

Example 14

A poly(glyceryl-citrate) based binder made with RHOPLEX™ R720 resin and SELVOL™ 502 polyvinyl alcohol was mixed with poly(glyceryl-citrate) to give a white milky liquid, and the formulation of EXAMPLE 14 is shown in Table 11. The same procedure in EXAMPLE 8 was used to evaluate the binder performances on glass mat.

TABLE 11

| Component | Weight, part | Weight, % |
|---|---|---|
| 40% poly(glyceryl-citrate) | 450.0 | 34.2 |
| RHOPLEX ™ GL720 | 100.0 | 7.6 |
| SELVOL ™ 502 (20%) | 144.0 | 11.0 |
| Glyoxal (40%) | 36.0 | 2.7 |
| H2O | 585.0 | 44.5 |
| Total | 1315.0 | 100.0 |

Two urea-formaldehyde based binders, FG-654A and FG-654NDF, were used as control samples and established a control range. The binders in Table 12 show similar performance as urea-formaldehyde binders on both dry tensile and wet tensile when they were cured at 218° C. for 3 minutes. The binders are sustainable polyester based compositions and with substantially low formaldehyde or are formaldehyde-free. The curing conditions were at 191° C. (375° F.), 202° C. (396° F.) and 218° C. (425° F.) for the respective samples as shown in Table 12. It has been observed that for the polyester materials described herein, a higher curing temperature and a higher tensile (dry/wet) are produced at a curing range from about 191° C. (375° F.) to about 218° C. (420° F.).

TABLE 12

Results of Binders on Glass Mat Hand Sheets

| Sample | Dry tensile, (lbf/1.5 inch) | Wet tensile, (lbf/1.5 inch) | LOI (%) | Curing Condition |
|---|---|---|---|---|
| Control A FG-654NDF/ GL720 | 76.91 | 47.64 | 20.38 | 191° C./3 min |
| Control B FG-654A/ GL720 | 67.78 | 40.43 | 20.15 | 191° C./3 min |
| EXAMPLE 8 | 60.40 | 20.73 | 17.4 | 191° C./3 min |
|  | 69.95 | 46.10 | 20.5 | 202° C./3 min |
|  | 74.34 | 53.54 | 20.1 | 218° C./3 min |
| EXAMPLE 9 | 73.27 | 48.47 | 20.6 | 218° C./3 min |
| EXAMPLE 10 | 75.48 | 40.94 | 15.5 | 218° C./3 min |
|  | 74.25 | 48.77 | 18.6 | 218° C./3 min |
|  | 80.06 | 45.63 | 19.9 | 218° C./3 min |
| EXAMPLE 11 | 83.56 | 45.27 | 19.4 | 218° C./3 min |
| EXAMPLE 12 | 83.56 | 45.27 | 20.09 | 218° C./3 min |
| EXAMPLE 13 | 61.06 | 23.81 | 20.9 | 191° C./3 min |
|  | 54.38 | 34.57 | 19.7 | 202° C./3 min |
|  | 60.94 | 42.53 | 20.1 | 218° C./3 min |
| EXAMPLE 14 | 79.01 | 46.00 | 20.0 | 218° C./3 min |

Performance of Poly(Glyceryl-Citrate)-Based Binders with MF Resins

Water soluble melamine-formaldehyde (MF) resins are compatible with poly(glyceryl-citrate) and improve glass mat tensile strength, especially wet tensile strength. Curing temperature vs. tensile strength was investigated and the results of poly(glyceryl-citrate)-based binder with MF resins are shown in Table 13 (Results of the Polyester with MF Resin on Glass Mat). The curing conditions were at 191° C. (375° F.) and 218° C. (425° F.) for the respective samples as shown in Table 13. The best results were obtained at 425° F. Poly(glyceryl-citrate)-based binders with MF resins offer very similar results as urea formaldehyde (UF) based binders.

TABLE 13

| No. | Sample | LOI (%) | Wet tensile, (lbf/1.5 inch) | Dry tensile, (lbf/1.5 inch) | Curing Condition |
|---|---|---|---|---|---|
| 0-1 | UF Control A | 20.38 | 51.32 | 76.91 | 375° F./3 min |
| 0-2 | UF Control D | 20.15 | 40.43 | 67.78 | 375° F./3 min |
| 1-1 | EXAMPLE 8B | 20.25 | 23.06 | 56.06 | 375° F./3 min |
| 1-2 | EXAMPLE 8B | 20.16 | 31.51 | 55.82 | 375° F./6 min |
| 1-3 | EXAMPLE 8 | 17.37 | 20.73 | 60.40 | 375° F./3 min |
| 1-4 | EXAMPLE 8 | 20.54 | 46.10 | 69.95 | 395° F./3 min |
| 1-5 | EXAMPLE 8 | 20.12 | 53.54 | 74.34 | 425° F./3 min |
| 1-6 | EXAMPLE 8 | 20.32 | 44.41 | 69.53 | 425° F./3 min |
| 1-7 | EXAMPLE 8 | 19.05 | 46.15 | 73.02 | 425° F./3 min |
| 1-8 | EXAMPLE 8 | 18.74 | 38.70 | 66.11 | 425° F./3 min |
| 2-1 | EXAMPLE 9 | 20.57 | 48.47 | 73.27 | 425° F./3 min |
| 3-1 | EXAMPLE 10 | 15.52 | 40.94 | 75.48 | 425° F./3 min |
| 3-2 | EXAMPLE 10 | 18.55 | 48.77 | 74.25 | 425° F./3 min |
| 3-3 | EXAMPLE 10 | 19.87 | 44.83 | 77.84 | 425° F./3 min |
| 4-1 | EXAMPLE 11 | 19.80 | 41.05 | 72.59 | 425° F./3 min |
| 4-2 | EXAMPLE 11 | 19.43 | 45.63 | 82.06 | 425° F./3 min |
| 5-1 | EXAMPLE 12 | 20.09 | 45.27 | 83.56 | 425° F./3 min |

The MF resins showed different pot life in poly(glyceryl-citrate). Astro Celrez DR-3 offers greater two weeks pot life and the next is Astro Celrez LA-15, and Astro Mel NW-3A showed a short pot life.

In the following Examples 15-17, embodiments of the polyester materials were mixed with poly(N-metholdacrylamide)-containing polymer to form a poly(glyceryl-citrate)-based liquid and a cured binder. In the following Examples 15-17 and Tables 14-17, the components are identified as described herein.

Example 15

Poly(Glyceryl-Citrate) based binder containing PVA was made by a process of mixing Fentak CT0234, 40% PGC from EXAMPLE 1, 20% SELVOL™ 502, 40% glyoxal and water with stirring until a clear solution was formed, and the formulation of EXAMPLE 15 is shown in Table 14.

TABLE 14

| Component | Weight, part | Weight, % |
|---|---|---|
| PGC from Example 1 (40%) | 450.00 | 40.69 |
| Fentak CT0234 (92.5%) | 5.42 | 0.49 |
| SELVOL ™ 502 (20%) | 144.11 | 13.0 |
| Glyoxal (40%) | 18.01 | 1.63 |
| H$_2$O | 488.25 | 44.15 |
| Total Weight | 1,105.79 | 100.00 |

Example 16

Poly(Glyceryl-Citrate) based binder comprising GL720 was prepared by following the procedure of EXAMPLE 15, and a milky white liquid was obtained. The formulation of EXAMPLE 16 is described in Table 15.

TABLE 15

| Component | Weight, part | Weight, % |
|---|---|---|
| PGC from Example 1 (40%) | 500 | 49.6 |
| RHOPLEX ™ GL 720 | 112 | 11.1 |
| H$_2$O | 397 | 39.4 |
| Total Weight | 1,009 | 100.0 |

Example 17

Poly(Glyceryl-Citrate) based binder with PVA and GL720 was prepared by following the procedure of Example 15, and milky white liquid was obtained. The formulation of EXAMPLE 17 is described in Table 16.

TABLE 16

| Component | Weight, part | Weight, % |
|---|---|---|
| PGC from Example 1 (40%) | 450.00 | 34.2 |
| RHOPLEX ™ GL720 | 100.00 | 7.6 |
| SELVOL ™ 502 (20%) | 144.00 | 11.0 |
| Glyoxal (40%) | 36.00 | 2.7 |
| H$_2$O | 585.00 | 44.5 |
| Total | 1,315.00 | 100.0 |

Table 17 shows the results of dry and wet tensile strength of glass mat hand sheets treated with the poly(glyceryl-citrate)-based binders of the above examples. EXAMPLE 15 with PVA has higher dry tensile strength than Example 1 (sample 3). EXAMPLE 16 exhibits better wet tensile strength than EXAMPLE 15 does, but less dry tensile strength due to no PVA. EXAMPLE 17 has both good wet and dry tensile strength.

It is believed that a methylol group of poly(N-methylolacrylamide)-containing emulsion takes part in crosslinking with poly(glyceryl-citrate) and PVA to form either an ether or an ester linkage. The binder is milky white liquid at ambient temperature and is stable for greater than three months. This is the storage time advantage of poly(N-methylolacrylamide)-containing resins over MF resins.

The abbreviations for Table 17 are as follows. PGC is Poly(glyceryl-citrate), GL 720 is RHOPLEX™ GL720, and PVA is poly(vinyl alcohol). UF654A and UF654NDF are an urea-formaldehyde products FG-654A and FG-654NDF as described herein. The curing conditions were at 191° C. (375° F.) and 218° C. (425° F.) for the respective samples as shown in Table 17.

TABLE 17

Results of Poly(glyceryl-citrate)-based binders

| Sample | LOI, % | Wet tensile, (lbf/1.5 inch) | Dry tensile, (lbf/1.5 inch) | Curing Cycle |
|---|---|---|---|---|
| 1. UF Control A | 20.38 | 51.32 | 76.91 | 375° F./3 min |
| 2. UF Control B | 20.15 | 40.43 | 67.78 | 375° F./3 min |

TABLE 17-continued

Results of Poly(glyceryl-citrate)-based binders

| Sample | LOI, % | Wet tensile, (lbf/1.5 inch) | Dry tensile, (lbf/1.5 inch) | Curing Cycle |
|---|---|---|---|---|
| 3. Example 1 | 20.25 | 24.84 | 55.68 | 425° F./3 min |
| 4. Example 15 | 18.65 | 30.45 | 67.51 | 425° F./3 min |
| 5. Example 16 | 20.06 | 42.53 | 60.94 | 425° F./3 min |
| 6. Example 17 | 19.95 | 46.00 | 76.68 | 425° F./3 min |

A method to prepare a poly(glyceryl-citrate)-melamine solution has been developed. Melamine dissolves in poly (glyceryl-citrate) in the presence of the small amount of an aldehyde compound at elevated temperature, such as a dialdehyde compound, for example glyoxal.

In the following Examples 18-25, embodiments of the polyester materials were mixed with melamine to form a binder. The presence of the small amount of glyoxal was also used to improve dissolution of melamine in the polyester materials. In summary, it was observed that polyester materials as described herein, such as poly(glyceryl-citrate)-melamine based binders, demonstrate excellent stability and good performance, including dry and wet tensile strength.

In the following Examples 18-25 and Tables 18-29, the components are identified as described herein.

Example 18

Poly(glyceryl-citrate)-Melamine (PGCM-8) was prepared by a process including the addition of 100.0 g of 40% poly (glyceryl-citrate) (pH=1.57, viscosity=30.2 cps) and 3.6 g of melamine powder to a three-necked round-bottomed flask equipped with a mechanical stirrer, a thermometer, and a water condenser. The mixture was heated with agitation at 70° C. for 1 hour to obtain a clear solution. After 4.0 g of 40% glyoxal was added, the solution was continuously stirred at 70° C. for 5 to 10 minutes. A clear colorless solution was obtained. The solids content was 45%. The formulation of EXAMPLE 18 is shown in Table 18.

TABLE 18

| Ingredient | Weight, part | Weight, % |
|---|---|---|
| 40% Poly(glyceryl-citrate) | 100.0 | 92.9 |
| Melamine | 3.6 | 3.4 |
| Glyoxal (40%) | 4.0 | 3.7 |
| Total | 107.6 | 100.0 |

Example 19

Poly(glyceryl-citrate)-Melamine (PGCM-10) was prepared by following the procedure in Example 18, and the formulation of EXAMPLE 19 is shown in Table 19. A clear colorless solution was obtained. The solids content was 47%.

TABLE 19

| Ingredient | Weight, part | Weight, % |
|---|---|---|
| 40% Poly(glyceryl-citrate) | 100.0 | 90.1 |
| Melamine | 4.4 | 4.0 |
| Glyoxal (40%) | 6.5 | 5.9 |
| Total | 110.9 | 100.0 |

Example 20

Poly(glyceryl-citrate)-Melamine (PGCM-13) was prepared by a process including the addition of 100.0 g of 40% poly(glyceryl-citrate), 5.9 g of melamine powder, and 13.0 g of 40% glyoxal to a three-necked round-bottomed flask equipped with a mechanical stirrer, a thermometer, and a water condenser. The mixture was heated with agitation at 70° C. for 1 hour to obtain a clear light yellow solution. The solids content was 51%. The formulation of EXAMPLE 20 is shown in Table 20.

TABLE 20

| Ingredient | Weight, part | Weight, % |
|---|---|---|
| 40% Poly(glyceryl-citrate) | 100.0 | 84.1 |
| Melamine | 5.9 | 5.0 |
| Glyoxal (40%) | 13.0 | 10.9 |
| Total | 118.9 | 100.0 |

Example 21

Poly(glyceryl-citrate)-Melamine (PGCM-15) was prepared by following the procedure of Example 20, and the formulation of EXAMPLE 21 is shown in Table 21. A clear yellow solution was obtained. The solids content was 53%.

TABLE 21

| Ingredient | Weight, part | Weight, % |
|---|---|---|
| 40% Poly(glyceryl-citrate) | 100.0 | 81.8 |
| Melamine | 7.3 | 6.0 |
| Glyoxal (40%) | 15.0 | 12.2 |
| Total | 122.3 | 100.0 |

Example 22

Poly(glyceryl-citrate)-Melamine (PGCM-20) was prepared by following the procedure of Example 20, and the formulation of EXAMPLE 22 is shown in Table 22. A clear yellow solution was obtained. The solids content was 56%.

TABLE 22

| Ingredient | Weight, part | Weight, % |
|---|---|---|
| 40% Poly(glyceryl-citrate) | 100.0 | 79.8 |
| Melamine | 10.3 | 8.2 |
| 40% Glyoxal | 15.0 | 12.0 |
| Total | 125.0 | 100.0 |

Example 23

The binder material made in Example 18 was also made with the addition of a polyvinyl alcohol. This modified material was made by the following processes.

Method A: adding 45.76 g of 40% poly(glyceryl-citrate) and 1.65 g of melamine powder to a three-necked round-bottomed flask equipped with a mechanical stirrer, a thermometer, and a water condenser. The mixture was heated with agitation at 70° C. for 1 hour to obtain a clear solution. After the solution was cooled to ambient temperature, 14.65 g of 20% SELVOL™ 502, 1.83 g of 40% glyoxal, and 36.11 g of water were immediately added into the solution. A clear colorless solution was obtained. The solids content was 23 wt. %.

TABLE 23A

| Ingredient | Weight, part | Weight, % |
|---|---|---|
| 40% poly(glyceryl-citrate) | 45.76 | 45.76 |
| Melamine | 1.65 | 1.65 |
| SELVOL ™ 502 (20%) | 14.65 | 14.65 |
| Glyoxal (40%) | 1.83 | 1.83 |
| H₂O | 36.11 | 36.11 |
| Total | 100.0 | 100.0 |

Method B: the solution made from EXAMPLE 18 was mixed with 20% SELVOL™ 502 and water at ambient temperature to obtain a colorless solution. The solids content was 23 wt. %.

TABLE 23B

| Ingredient | Weight, part | Weight, % |
|---|---|---|
| PGCM-8 from EXAMPLE 18 (45%) | 49.24 | 49.24 |
| SELVOL ™ 502 (20%) | 14.65 | 14.65 |
| H₂O | 36.11 | 36.11 |
| Total | 100.00 | 100.00 |

Example 24

PGCM-15 solution obtained from EXAMPLE 21 was reacted with 20% SELVOL™ 502 solution and water to obtain a clear liquid solution. The solids content was 19%. Preparation of glass mat using the binder of Example 24 and measurements were conducted by following EXAMPLE 23. The formulation of EXAMPLE 24 is shown in Table 24.

TABLE 24

| Component | Weight, part | Weight, % |
|---|---|---|
| PGCM-15 from EXAMPLE 5 (53%) | 848.75 | 38.92 |
| SELVOL ™ 502 (20%) | 224.17 | 10.28 |
| H₂O | 1,108.10 | 50.81 |
| Total | 2,181.02 | 100.00 |

Example 25

PGCM-20 Based Binder was made by a PGCM-20 solution obtained from EXAMPLE 22 mixed with 20% SELVOL™ 502 solution and water to obtain a clear liquid binder. The solids content was 19%. Preparation of glass mat using the binder of Example 25 and measurements were conducted by following EXAMPLE 23. The formulation of EXAMPLE 25 is shown in Table 25.

TABLE 25

| Ingredient | Weight, part | Weight, % |
|---|---|---|
| 56% PGCM-20 from EXAMPLE 6 | 848.75 | 38.92 |
| SELVOL ™ 502 (20%) | 224.17 | 10.28 |
| H₂O | 1,108.10 | 50.81 |
| Total | 2,181.02 | 100.00 |

TABLE 26

Physical Properties of Poly(glyceryl-citrate)-melamine

| Sample | pH | η, cP |
|---|---|---|
| Control Poly(glyceryl-citrate) | 1.57 | 30 |
| EXAMPLE 18 | 2.48 | 31 |
| EXAMPLE 19 | 2.76 | 31 |
| EXAMPLE 20 | 2.94 | 36 |
| EXAMPLE 21 | 3.04 | 41 |
| EXAMPLE 22 | 3.29 | 43 |

Melamine dissolves in poly(glyceryl-citrate) in the presence of glyoxal to form a stable clear solution, resulting in increasing pH and viscosity, indicating that melamine forms poly(glyceryl-citrate)-melamine "salt". PGCM is Poly(glyceryl-citrate)-melamine in the following table. The curing conditions were at 191° C. (375° F.) and 218° C. (425° F.) for the respective samples as shown in Table 27.

TABLE 27

Results of Formulation of Binders on Glass Mat

| Sample | Dry tensile, (lbf/1.5 inch) | Wet tensile, (lbf/1.5 inch) | LOI, % | Curing Condition |
|---|---|---|---|---|
| Control A FG 654NDF/ GL720 | 76.91 | 51.32 | 20.38 | 191° C./3 min |
| Control B FG 654A/ GL720 | 67.78 | 40.43 | 20.15 | 191° C./3 min |
| Control C Poly(glyceryl-citrate) from EXAMPLE 1 | 55.68 | 24.84 | 20.25 | 218° C./3 min |
| EXAMPLE 23 | 74.61 | 41.85 | 20.63 | 218° C./3 min |
| EXAMPLE 24 | 59.74 | 35.78 | 17.37 | 218° C./3 min |
|  | 69.91 | 41.94 | 19.74 |  |
|  | 72.51 | 48.22 | 20.57 |  |
| EXAMPLE 25 | 57.59 | 35.01 | 17.40 | 218° C./3 min |
|  | 57.89 | 33.78 | 18.59 |  |

Two urea-formaldehyde based binders, FG-654A and FG-654NDF, were used as control samples and established a control range. Control C is a polyester-based binder without melamine crosslinker from Example 1. The composition of EXAMPLE 24 shows similar dry and wet tensile as two urea-formaldehyde samples (Control A and B) and improved properties as compared to poly(glyceryl-citrate) resin only (Control C), indicating that poly(glyceryl-citrate) was crosslinked with melamine at 218° C.

Glyoxal increases the melamine solubility in poly(glycerol-citrate) due to a chemical reaction. As shown in Table 28, viscosity and pH of the solution increases when more melamine is dissolved in the solution.

TABLE 28

Property of Poly(glyceryl-citrate)-melamine

| Experiment | PGCM Solution | Melamine, % | Glyoxal, % | pH | η, cP |
|---|---|---|---|---|---|
| Control | Poly(glyceryl-citrate) | 0 | 0 | 1.57 | 30 |
| 1 | Example 18 | 3.4 | 1.5 | 2.48 | 31 |
| 2 | Example 19 | 4.0 | 2.3 | 2.76 | 31 |
| 3 | Example 20 | 5.0 | 4.4 | 2.94 | 36 |
| 4 | Example 21 | 6.0 | 4.9 | 3.04 | 41 |
| 5 | Example 22 | 8.2 | 4.8 | 3.29 | 43 |

It has been found that poly(glyceryl-citrate)-melamine enhances wet tensile strength of the glass mat. Compared with UF and MF resins, high curing temperature is required to poly(glycerol-citrate)-melamine based binders.

Poly(glyceryl-citrate)-melamine type binders are formaldehyde free binders. The binders are aqueous solutions and are very stable under ambient conditions. The curing conditions were at 191° C. (375° F.) and 219° C. (425° F.) for the respective samples as shown in Table 29.

TABLE 29

Results of Formulation of Binders on Glass Mat

| No. | Sample | LOI, % | Wet tensile, (lbf/1.5 inch) | Dry tensile, (lbf/1.5 inch) | Curing Condition |
|---|---|---|---|---|---|
| 1 | UF Control A | 20.38 | 51.32 | 76.91 | 375° F./3 min |
| 2 | UF Control D | 20.15 | 40.43 | 67.78 | 375° F./3 min |
| 3 | Example 1 | 20.25 | 24.84 | 55.68 | 425° F./3 min |
| 4 | Example 7 | 18.65 | 30.45 | 67.51 | 425° F./3 min |
| 5 | Example 23 | 20.63 | 41.85 | 74.61 | 425° F./3 min |
| 6A | Example 24 | 17.37 | 35.78 | 59.74 | 425° F./3 min |
| 6B | Example 24 | 19.74 | 41.94 | 69.91 | 425° F./3 min |
| 6C | Example 24 | 20.57 | 48.22 | 72.51 | 425° F./3 min |
| 7A | Example 25 | 17.40 | 35.01 | 57.59 | 425° F./3 min |
| 7B | Example 25 | 18.59 | 33.78 | 57.89 | 425° F./3 min |
| 7C | Example 25 | 20.06 | 38.70 | 65.61 | 425° F./3 min |

A method to prepare a poly(glyceryl-citrate) based binder containing crosslinkable acrylic solution has been developed. In the following Examples 26-28, embodiments of the polyester materials were mixed with a crosslinkable acrylic polymer to form a binder. The presence of the small amount of an aldehyde compound, such as glyoxal, and polyvinyl alcohol was also used to improve the properties of the polyester materials.

In the following Examples 26-28 and Tables 30-32, the components are identified as follows if not already described herein. Aquaset™ 100 and Aquaset™ 600 solutions are formaldehyde-free thermosetting acrylic polymers commercially available from Dow Chemical.

Example 26

Poly(glyceryl-citrate) based binder containing acrylic solutions were prepared by a method including charging 300.0 g of the polyester (66%) made as shown in Example 1, 780.8 g of D.I. water, 51.4 g of Aquaset™ 100 (50%), 64.2 g of SELVOL™ 418 (20%), and 51.4 g of glyoxal (40%) to 2-Liter beaker with a mechanical agitator while stirring at room temperature. A clear light yellow solution was formed after mixing. Totally, nine different formulations listed on Table 30 were prepared using the same procedure as previous one.

TABLE 30

Ingredient of Binder Formulation in EXAMPLE 26

| Sample No. | Example 1 (66%) | Aquaset™ 100 (50%) | SELVOL™ 418 (20%) | Glyoxal (40%) | H$_2$O |
|---|---|---|---|---|---|
| 1 | 300.0 | 51.4 | 64.2 | 51.4 | 780.8 |
| 2 | 380.0 | 10.8 | 67.5 | 0.0 | 850.4 |
| 3 | 350.0 | 10.9 | 67.9 | 54.3 | 1002.6 |

TABLE 30-continued

Ingredient of Binder Formulation in EXAMPLE 26

| Sample No. | Example 1 (66%) | Aquaset™ 100 (50%) | SELVOL™ 418 (20%) | Glyoxal (40%) | H$_2$O |
|---|---|---|---|---|---|
| 4 | 550.0 | 53.5 | 189.3 | 44.6 | 1600.2 |
| 5 | 290.0 | 9.0 | 146.3 | 0.0 | 1055.3 |
| 6 | 350.0 | 54.4 | 67.9 | 0.0 | 1018.3 |
| 7 | 280.0 | 48.0 | 156.0 | 0.0 | 927.4 |
| 8 | 250.0 | 47.8 | 155.5 | 47.9 | 905.3 |
| 9 | 280.0 | 9.6 | 156.4 | 48.0 | 918.0 |

Example 27

Preparation and measurement of glass mat hand sheets were performed by the following tests on samples (formulations) 1-9 in Table 30 above with the results shown in Table 31 below.

Tear Test: The glass mat hand sheet was cut in 2.5×11.8 inch (6.4×30 cm) rectangular specimen. Three sheets of the rectangular glass mat as one specimen were measured on ProTear (Thwing-Albert Instrument Co.) and an average tear value was obtained from six measurements.

Caliper Test: The glass mat was cut in 1.5×4 inch (3.8×10.2 cm) rectangular specimen. Total twenty one sheets as one specimen were measured on a Mahr Federal dial drop indicator and an average thickness of a single sheet was obtained. Average thickness for individual sheet ranged from 35 to 38 mils (0.89 to 0.97 mm).

Wet Web Strength: An uncured glass mat hand sheet was tested on a wet web test instrument. The uncured wet glass mat was laid over a sheet of plastic with a hole in the center. Then weight was continuously added to the center of the mat to elongate the uncured mat to a defined distance. The final weight was recorded as the wet web strength of the uncured mat. In this instance, water was dropped into a paper cup on the glass mat until the glass mat sagged in ½ inch. Weight of water in the cup indicates the wet web strength. The curing conditions were at 191° C. (375° F.), 204° C. (400° F.), and 216° C. (420° F.) for the respective samples as shown in Table 31.

The strength of a partly-dewatered or wet-pressed sheet is called "wet-web strength" or "green strength." This characteristic has nothing to do with wet strength. Rather, wet-web strength is dependent on such factors as fiber length, the coefficient of friction between adjacent moist fibers, and capillary forces in the liquid meniscus between two fibers. Substrates with high wet-web tensile strength at a given solids level tends to run faster and with fewer web breaks on machines that have open draws before or within the wet-press section. Sometimes the best predictor of runnability is the relationship between wet-web strength and the percent stretch to breakage. In order to prevent a mat web from breaking during production, the speed of the production line has to be adjusted (reduced) to the wet web strength of the wet glass mat before curing.

TABLE 31

Results of Binders on Glass Mat Hand Sheets

| Sample | LOI, % | Wet tensile, (lbf/1.5 inch) | Dry tensile, (lbf/1.5 inch) | Elmendorf Tear, gf, 3 sheets | Caliper Thickness (mil) | Cure Condition | Wet Web Strength (g) |
|---|---|---|---|---|---|---|---|
| Control | 19.63 | 47.22 | 73.35 | 326.5 | 40.3 | 375° F./3 min | 184 |
|  | 19.01 | 48.28 | 69.87 | 417.2 | 38.9 | 400° F./3 min | — |
| 1 | 19.02 | 52.59 | 87.24 | 365.5 | 38.0 | 420° F./3 min | — |
| 2 | 19.05 | 45.11 | 75.18 | 320.3 | 37.8 | 420° F./3 min | — |
| 3 | 19.08 | 54.52 | 90.25 | 342.8 | 34.2 | 420° F./3 min | — |
| 4 | 19.02 | 54.70 | 78.99 | 359.6 | 36.4 | 420° F./3 min | — |
| 5 | 19.22 | 43.77 | 80.69 | 339.7 | 37.0 | 420° F./3 min | — |
| 6 | 19.15 | 47.90 | 74.36 | 313.7 | 38.7 | 420° F./3 min | — |
| 7 | 19.12 | 53.90 | 88.47 | 375.7 | 36.2 | 420° F./3 min | — |
| 8 | 19.15 | 41.64 | 87.79 | 394.3 | 37.3 | 375° F./3 min | 320 |
|  | 19.08 | 54.67 | 93.70 | 331.8 | 35.9 | 400° F./3 min | 340 |
|  | 19.05 | 57.88 | 93.91 | 377.2 | 35.6 | 420° F./3 min | — |
| 9 | 19.08 | 54.12 | 90.25 | 342.8 | 34.2 | 420° F./3 min | — |

The binder of the control sample is made from a commercial resin UF-654 (Momentive Specialty Chemicals) and a latex RHOPLEX™ RL720 (Dow Chemical). UF-based binder is typically cured at 375° F. and higher temperature results in the degradation of the UF resin. Tests were conducted based on formulation listed in Table 30 and the results are shown in Table 31. Most of the results in Table 31 are much better than the control samples in the tensile strength. Wet tensile strength and dry tensile strength are key factors for roofing shingle glass mat. The thickness of the glass mat measured by a "caliper" method and the thinner mat will results in longer length in a roll.

Example 28

Additional preparation and measurement of glass mat hand sheet were performed as shown in Example 27, and as listed in Table 32 below.

TABLE 32

| Sample | LOI, % | Wet tensile, (lbf/1.5 inch) | Dry tensile, (lbf/1.5 inch) | Curing conditions |
|---|---|---|---|---|
| UF Control A | 20.38 | 51.32 | 76.91 | 375° F./3 min |
| UF Control D | 20.15 | 40.43 | 67.78 | 375° F./3 min |
| Example 7 | 18.16 | 31.03 | 67.51 | 375° F./3 min |
| Sample 8 in Table 31 | 20.06 | 55.66 | 92.82 | 420° F./3 min |
| Sample 8 in Table 31 | 19.15 | 50.50 | 88.30 | 420° F./3 min |
| Sample 8 in Table 31 | 19.15 | 49.85 | 88.98 | 420° F./3 min |

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

What is claimed is:

1. A binder material prepared using a formulation comprising:
   a polyester material formed from at least one organic acid having three carboxylic groups and at least one multi-hydroxyl alcohol having three hydroxyl groups;
   a cross-linking agent comprising an acrylic polymer; and
   a vinyl alcohol containing polymer, wherein the binder material is free of formaldehyde.

2. The binder material of claim 1, wherein the formulation further comprises a formaldehyde-free aldehyde compound.

3. The binder material of claim 1, wherein the vinyl alcohol containing polymer comprises from about 0.1 wt. % to about 20 wt. % of the formulation.

4. The binder material of claim 1, wherein the acrylic polymer is selected from the group consisting of polyacrylic acid, polyacrylic ether polymer, polyacrylic ester polymer, polyacrylic amide polymer, and combinations thereof.

5. The binder material of claim 1, wherein the acrylic polymer comprises from about 0.1 wt. % to about 50 wt. % of the formulation.

6. The binder material of claim 2, wherein the formaldehyde-free aldehyde compound comprises from about 0.1 wt. % to about 10 wt. % of the formulation.

7. The binder material of claim 1, wherein vinyl alcohol containing polymer comprises polyvinyl alcohol, a derivative thereof or a co-polymer thereof.

8. The binder material of claim 2, wherein the formaldehyde-free aldehyde compound is selected from the group consisting of glyoxal, glutaraldehyde compound, and combinations thereof.

9. The binder material of claim 1, wherein the polyester material is water-soluble.

10. The binder material of claim 1, wherein the at least one organic acid having three carboxylic groups comprises citric acid.

11. The binder material of claim 1, wherein the at least one multi-hydroxyl alcohol having three hydroxyl groups is selected from the group consisting of glycerol, trimethylolpropane, trimethyolethane, and combinations thereof.

12. The binder material of claim 1, wherein the molar ratio of at least one organic acid to at least one multi-hydroxyl alcohol is from 1:3 to 3:1.

13. An article of manufacture comprising:
   a substrate; and
   a binder material, wherein:
      the substrate comprises a fibrous material selected from the group consisting of glass fibers, mineral fibers (mineral wool), polyester fibers, cellulose materials, and combinations thereof;
      the binder material functions to adhere the substrate together into or within the article of manufacture; and the binder material is prepared using a formulation comprising:
- a polyester material formed from at least one organic acid containing three carboxylic groups and at least one multi-hydroxyl alcohol containing three hydroxyl groups; and
- a cross-linking agent comprising an acrylic polymer; and
- a vinyl alcohol containing polymer, wherein the binder material is free of formaldehyde.

14. The article of claim 13, wherein the binder material is prepared using a formulation further comprising a formaldehyde-free aldehyde compound.

15. The article of claim 13, wherein the article of manufacture has a dry tensile strength from 40 lbf/1.5 inch to 100 lbf/1.5 inch.

16. The article of claim 13, wherein the article of manufacture has a wet tensile strength from 3 lbf/1.5 inch to 70 lbf/1.5 inch.

17. The article of claim 13, wherein the fibrous material comprise from about 70 wt. % to about 95 wt. % of the article of manufacture.

18. The binder material of claim 1, wherein the polyester material is a self-crosslinkable polyester material.

19. The article of claim 13, wherein the polyester material is a self-crosslinkable polyester material.

20. The article of claim 13, wherein the vinyl alcohol containing polymer comprises from about 0.1 wt. % to about 20 wt. % of the formulation.

21. The article of claim 13, wherein the vinyl alcohol containing polymer comprises polyvinyl alcohol, a derivative thereof or a co-polymer thereof.

22. The article of claim 14, wherein the formaldehyde-free aldehyde compound comprises from about 0.1 wt. % to about 10 wt. % of the formulation.

* * * * *